(12) United States Patent
McMahon et al.

(10) Patent No.: US 6,802,270 B1
(45) Date of Patent: Oct. 12, 2004

(54) TRAILER INCORPORATING CARRIAGE SYSTEM

(75) Inventors: Randy McMahon, Lakeville, MN (US); Frank Bazzoli, Saint James, MN (US); Trent J. Hoek, Mountain Lake, MN (US)

(73) Assignee: Balzer, Inc., Mountain Lake, MN (US)

( * ) Notice: Subject to any disclaimer, the term of this patent is extended or adjusted under 35 U.S.C. 154(b) by 16 days.

(21) Appl. No.: 10/313,577

(22) Filed: Dec. 4, 2002

(51) Int. Cl.[7] .............................................. A01C 23/00
(52) U.S. Cl. ..................................................... 111/123
(58) Field of Search ................. 111/118–126, 127–139, 111/925

(56) References Cited

U.S. PATENT DOCUMENTS

| | | | | |
|---|---|---|---|---|
| 4,014,271 A | * | 3/1977 | Rohlf et al. ................ | 111/123 |
| 4,056,226 A | * | 11/1977 | Hodgson .................... | 239/172 |
| 4,114,815 A | * | 9/1978 | Gijsbers ...................... | 241/45 |
| 4,272,031 A | * | 6/1981 | Jines ......................... | 241/46.17 |
| 4,756,260 A | * | 7/1988 | Petersen ..................... | 111/123 |
| 5,271,567 A | * | 12/1993 | Bauer ......................... | 239/662 |
| 2003/0221599 A1 | * | 12/2003 | Kinsella et al. ............. | 111/121 |

* cited by examiner

*Primary Examiner*—Christopher J. Novosad
(74) *Attorney, Agent, or Firm*—Nikolai & Mersereau, P.A.

(57) ABSTRACT

A trailer incorporator for towing behind a slurry wagon for incorporating slurry into soil on farms comprising a manifold for distributing the slurry to a plurality of injectors mounted on the trailer, a plurality of coulters on the trailer and adjustments to position the injectors, coulter and wheels on the trailer and for tilting the trailer fore and aft. The trailer has one connection point to the slurry wagon to allow a pivotable connection for ease of making turns with the trailer when the coulters and plows are engaging the soil. The trailer removes weight from the slurry wagon allowing for a wider distribution of slurry by a wider trailer, and removing weight from the slurry wagon reducing soil compaction and allowing for more slurry to be put in the slurry wagon without overloading it. The trailer therefore allows for more efficient operations.

11 Claims, 1 Drawing Sheet

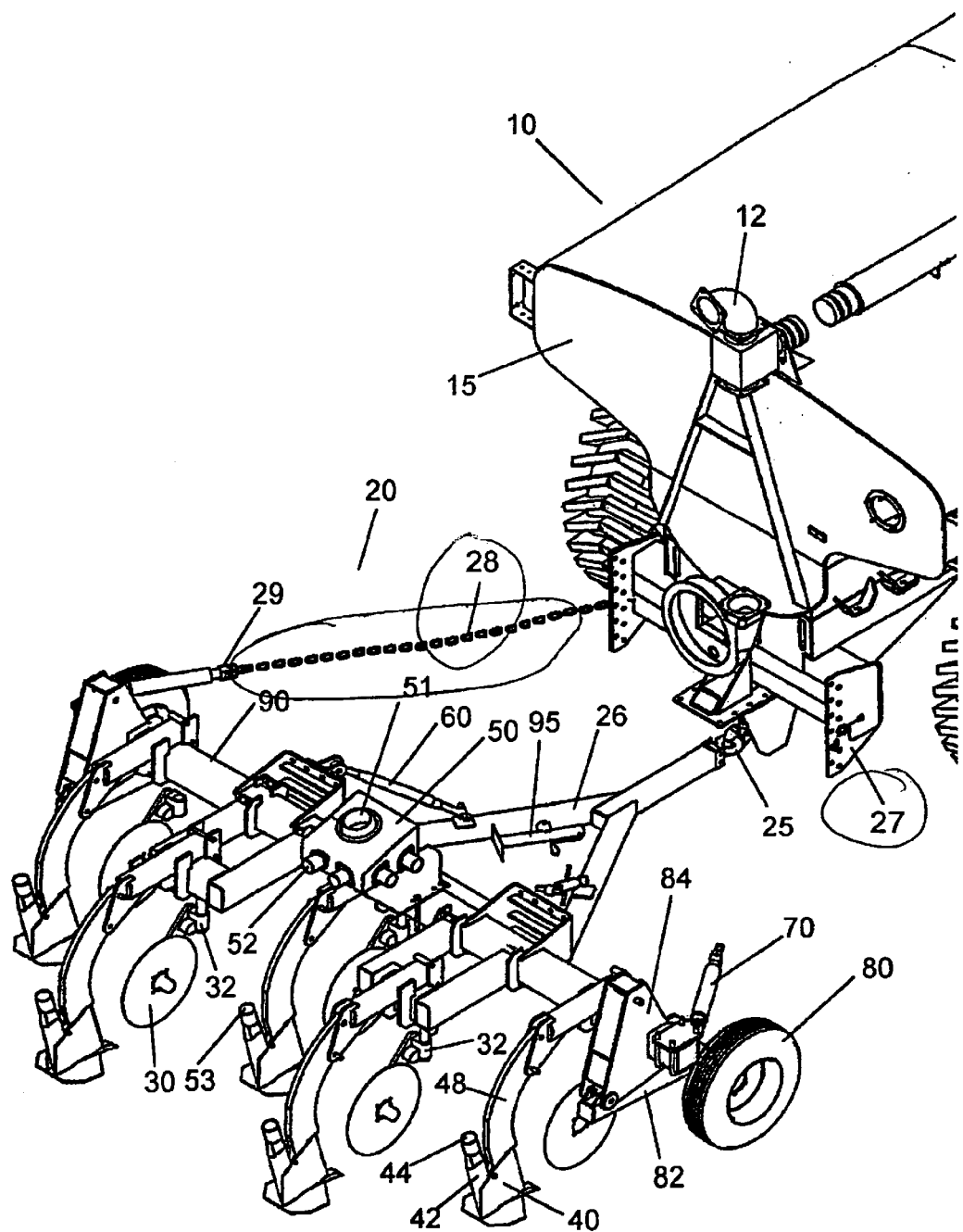

TRAILER INCORPORATING CARRIAGE SYSTEM

BACKGROUND OF THE INVENTION

1. Field of the Invention

This invention relates to liquid slurry incorporators and more specifically to a trailer having a single point hitch for incorporation of the slurry.

2. Description of the Related Art

Slurry wagons having an incorporator directly attached to them only allow for the incorporator to be raised or lowered and in some cases pitched fore or aft. The incorporator is limited in width and weight due to the wagon's capacity to support the applicator. The ability of the wagon to turn while incorporating without jeopardizing the structural integrity of the slurry wagon and/or the incorporator is limited with the incorporator directly attached to the wagon.

Further, it is important to limit the number of times the applicator is run through the fields to avoid soil compaction which will reduce crop yields.

SUMMARY OF THE INVENTION

The trailing incorporator carriage system uses a separate trailer for carrying the applicator. There is a one-point hitch connecting the trailer to the slurry wagon. The trailer allows for turning the wagon more readily without stress on the applicator. Further the trailer supports the applicator so that the wagon need not support the weight and can thus carry more slurry without overloading the slurry wagon making for a more efficient use of the wagon and fewer refills due to overloading.

The trailer allows for a wider applicator by reducing the weight of the applicator on the slurry wagon and allowing the easier turning by the one point hitch. Further a wider applicator will reduce the number of passes of the applicator through the field reducing the soil compaction and increasing the efficiency of the operator by more quickly applying the slurry.

OBJECTS OF THE INVENTION

It is an object of the invention to provide a wider applicator.

It is an object of the invention to increase the turning ability of the applicator.

It is an object of the invention to lower the weight carried by the slurry wagon.

It is an object of the invention to reduce soil compaction.

It is an object of the invention to reduce the number of passes required for application.

It is an object of the invention to decrease the stress on the applicator when turning.

It is an object of the invention to increase the amount of slurry carried in the slurry wagon.

It is an object of the invention to increase efficiency of applying slurry.

Other objects, advantages and novel features of the present invention will become apparent from the following description of the preferred embodiments when considered in conjunction with the accompanying drawings.

BRIEF DESCRIPTION OF THE DRAWINGS

The FIGURE is a perspective view of the rear portion of a slurry wagon and the trailer incorporator.

DESCRIPTION OF THE PREFERRED EMBODIMENTS

A slurry wagon 10 is generally pulled by a farm tractor to distribute slurry in a farm field. The slurry wagon 10 has a trailer hitch such as pintle hitch 25 for connecting a trailer incorporator 20 behind the slurry wagon. The slurry wagon 10 has a tank 15 for carrying the slurry to be incorporated into the soil. The slurry wagon 10 has a hose connector 12 for a hose, which is connected to hose connector 51 on incorporator manifold 50 on the trailer incorporator 20 to deliver slurry to the trailer.

The trailer incorporator 20 has a tow bar 26 connected to the slurry tank at a pivot point provided by the pintle hitch 25. The trailer 20 can then pivot behind the slurry wagon 10 for aiding in turning since the plows 40 and coulters 30 will not be constrained to be straight behind the slurry wagon as it would be if directly attached to the slurry wagon 10 at two or more points such as at plates 27 as is the general practice with other incorporators. The trailer incorporator 20 has a tow bar 26 for connecting it to the slurry wagon 10 and has centering pistons 70 for connecting a chain 28 to plate 27 and to a chain connector 29 on the centering piston 70 for aiding in keeping the trailer incorporator 20 behind the slurry wagon 10 particularly when backing up.

To distribute the slurry from tank 15 the slurry is pumped from the tank 15 on the slurry wagon 10 through connector 12, which connects to a hose leading to connector 51 on manifold 50 on the incorporator trailer 20. The manifold 50 has a plurality of hose connectors 52 for distributing the slurry to hose connectors 44 on magnum plow injectors 42 attached to plows 40. The magnum plow injectors regulate the flow rate of the slurry to control the amount of slurry applied to the soil. Although a magnum plow injector has been shown as the means for allying the slurry and means of applying the slurry can be used.

The width of the incorporator trailer 20 can be longer than an incorporator directly attached to the slurry wagon 10 at two or more points because it pivots at the trailer hitch 25 thus allowing turns to be made without putting as much stress on the plows 40 and or coulters 30. Further the incorporator trailer 20 allows a wider application since the wider trailer's weight is entirely supported on the trailer 20 and not on the slurry wagon 10. The reduction of weight on the slurry wagon 10 has many benefits including reducing the soil compaction caused by the slurry wagon, while allowing the slurry wagon to carry more slurry without overloading it. Thus the slurry wagon 10 need not be refilled as often increasing the efficiency of operating the slurry wagon 10.

The incorporator trailer 20 can tilt fore or aft by use of hydraulic cylinders 60 and the trailer can be raised or lowered by hydraulics in housing 84 which moves arm 82 to raise or lower the wheels 80 relative to the plows 40 and coulters 30.

Pivot bar 90 is pivotally mounted on the tow bar 26 and allows the turnbuckles 60 to tilt the trailer 20 fore and aft.

The coulters 30 can also be adjusted up and down by adjustments 32.

Jack stands 95 connected to the tow bar 26 can be pivoted downward to hold up the trailer 20 when not in use and pivoted parallel to the tow bar 26 when the trailer is in use.

As can readily be understood the hydraulic drives may be replaced by electric motors or other means for applying force. Further the width of the incorporator trailer 20 may be varied according to the size of the tractor and slurry wagon 10 being used. Similarly the number of plows 40, plow injectors 42 and coulters 30 may be varied.

The coulters 30 may be removed from the trailer incorporator 20 for strictly incorporation of slurry into the soil with the trailer, however is maybe desirable to use the coulters while incorporating slurry as is a common practice.

Obviously, many modifications and variations of the present invention are possible in light of the above teachings. It is therefore to be understood that, within the scope of the appended claims, the invention may be practiced otherwise than as specifically described.

What is claimed is:

1. A trailer incorporator comprising:

a tow bar for connecting a trailer to a slurry wagon at a pivot point by use of a trailer hitch, a manifold for receiving slurry from the slurry wagon and distributing the slurry, at least one plow injector for receiving slurry from the manifold and injecting the slurry into soil, a pair of wheels one on either side of the trailer incorporator for supporting the trailer when desired, a wheel positioner connected to each wheel for adjusting the position of the wheel relative to the trailer incorporator, at least one coulter connected to the trailer for tilling the soil, a coulter positioner connected to each coulter for adjusting the position of the coulter relative to the trailer incorporator.

2. A trailer incorporator as in claim 1 having, a jack stand connected to the trailer tow bar.

3. A trailer incorporator as in claim 1 having, a pivot bar and a turnbuckle mounted between the pivot bar and the tow bar to tilt the trailer fore and aft.

4. A trailer incorporator as in claim 1 having, centering pistons connected at each side of the trailer and having a chain connecting the centering pistons to plates on either side of the trailer hitch on the slurry wagon to aid in backing the trailer.

5. A trailer incorporator comprising:

a tow bar for connecting a trailer to a slurry wagon at a pivot point by use of a trailer hitch, a manifold for receiving slurry from the slurry wagon and distributing the slurry, at least one plow injector for receiving slurry from the manifold and injecting the slurry into soil, a pair of wheels one on either side of the trailer incorporator for supporting the trailer when desired, a wheel positioner connected to each wheel for adjusting the position of the wheel relative to the trailer incorporator, a pivot bar and a turnbuckle mounted between the pivot bar and the trailer to tilt the trailer fore and aft.

6. A trailer incorporator as in claim 5 having, a jack stand connected to the trailer tow bar.

7. A trailer incorporator as in claim 5 having, centering pistons connected at each side of the trailer and having a chain connecting the centering pistons to plates on either side of the trailer hitch on the slurry wagon to aid in backing the trailer.

8. A trailer incorporator as in claim 7 having, centering pistons connected at each side of the trailer and having a chain connecting the centering pistons to plates on either side of the trailer hitch on the slurry wagon to aid in backing the trailer.

9. A trailer incorporator as in claim 8 having, a jack stand connected to the trailer tow bar.

10. A trailer incorporator comprising:

a tow bar for connecting a trailer to a slurry wagon at a pivot point by use of a trailer hitch, a manifold for receiving slurry from the slurry wagon and distributing the slurry, at least one plow injector for receiving slurry from the manifold and injecting the slurry into soil, a pair of wheels one on either side of the trailer incorporator for supporting the trailer when desired, a wheel positioner connected to each wheel for adjusting the position of the wheel relative to the trailer incorporator, centering pistons connected at each side of the trailer and having a chain connecting the centering pistons to plates on either side of the trailer hitch on the slurry wagon to aid in backing the trailer.

11. A trailer incorporator as in claim 10 having, a jack stand connected to the trailer tow bar.

* * * * *